No. 666,059. Patented Jan. 15, 1901.
A. MUEHLBEIN.
CAKE RACK.
(Application filed Apr. 16, 1900.)
(No Model.) 2 Sheets—Sheet 2.
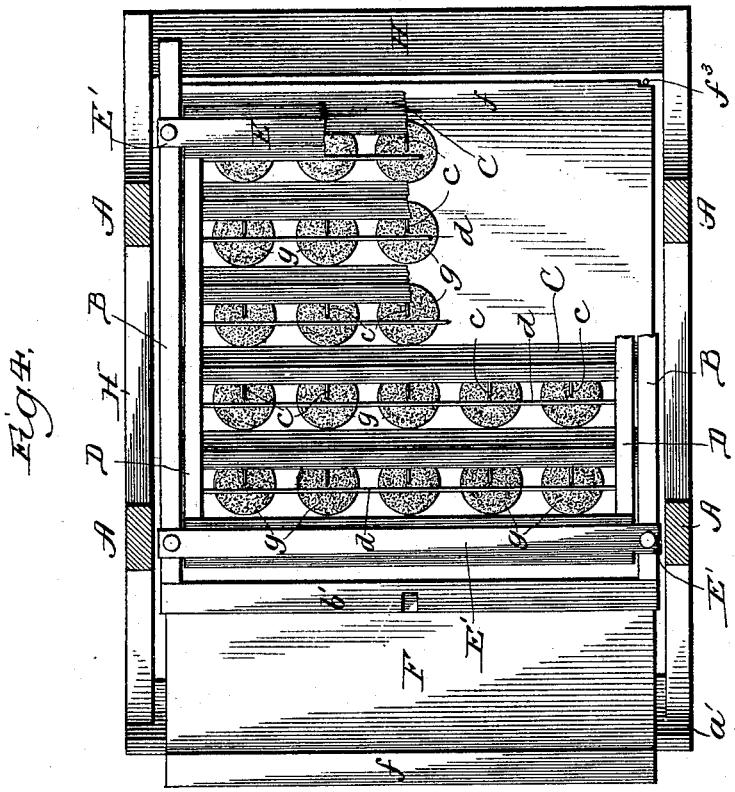
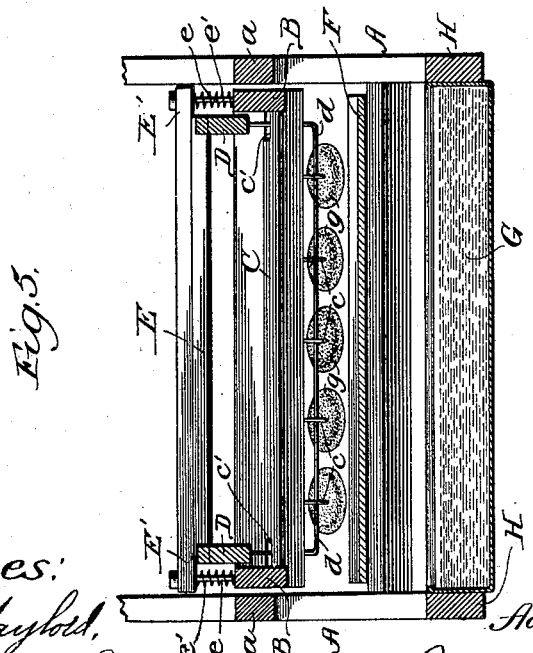
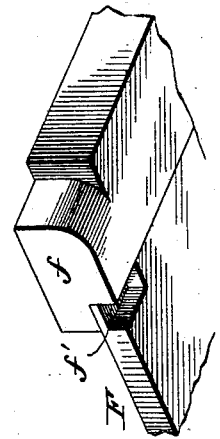
Witnesses:
Inventor:
Adolph Muehlbein,
By Banning & Banning,
Att'ys.

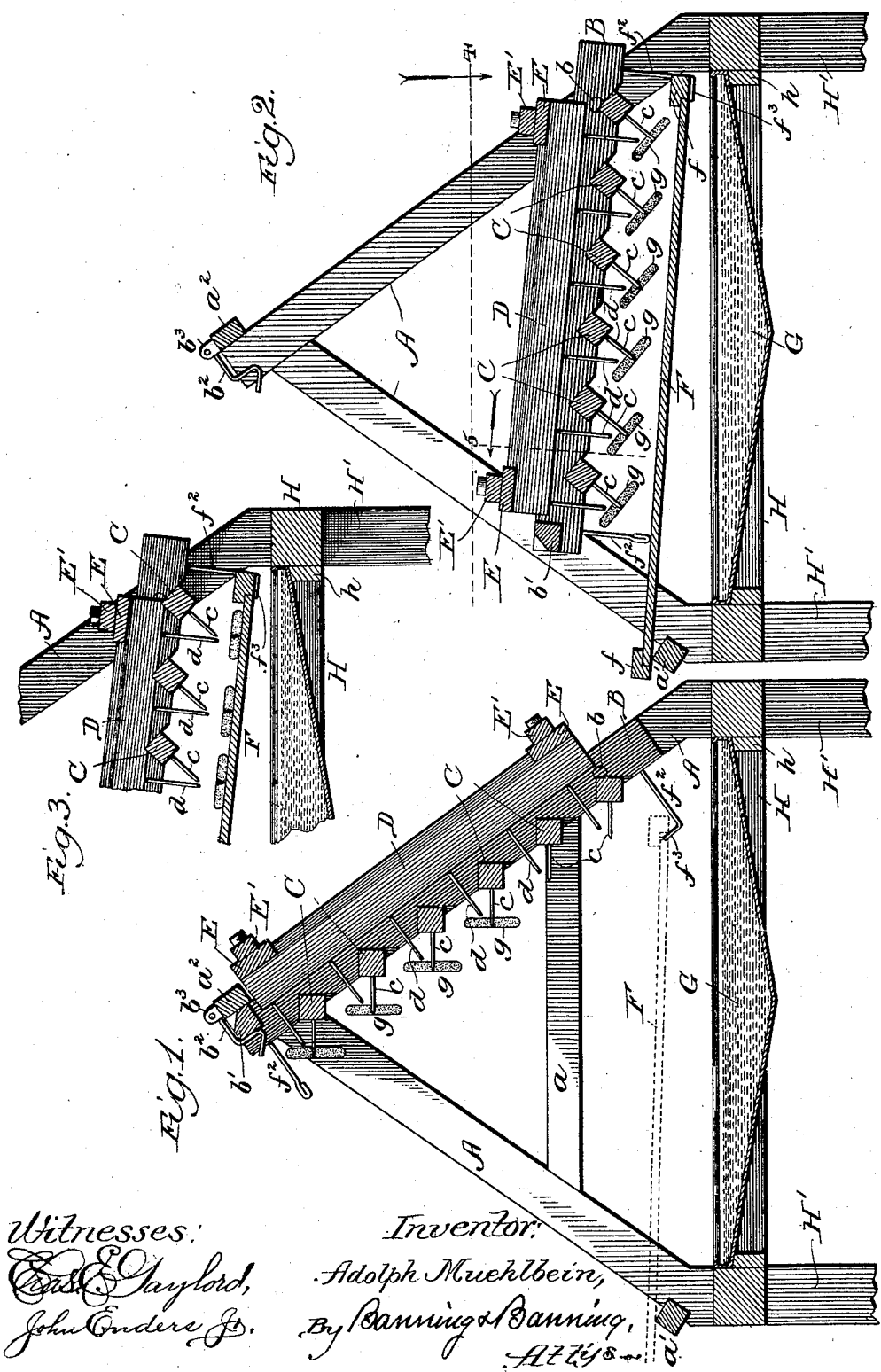

UNITED STATES PATENT OFFICE.

ADOLPH MUEHLBEIN, OF CHICAGO, ILLINOIS.

CAKE-RACK.

SPECIFICATION forming part of Letters Patent No. 666,059, dated January 15, 1901.

Application filed April 16, 1900. Serial No. 13,078. (No model.)

*To all whom it may concern:*

Be it known that I, ADOLPH MUEHLBEIN, a citizen of the United States, residing at Chicago, in the county of Cook and State of Illinois, have invented a certain new and useful Improvement in Cake-Racks, of which the following is a specification.

In making frosted cakes it is necessary after the cakes have been dipped in the frosting to place them on a rack to drip and harden the frosting, so that it will remain affixed to the cakes. As now practiced it is customary to place each individual cake on the rack after it has been frosted and so continue until the rack is full, and after the frosting on the cakes on the full rack has become hardened each cake is separately removed from the rack, the practice being to place the frosted cakes on and remove them from the rack one by one and by hand. This placement of the frosted cakes on and removal of them from the racks one by one results in a great loss of time and much extra labor, as it requires a movement of the hand in the removal of each individual cake.

The object of my invention is to construct a rack for the reception of a number of frosted cakes, from which after the frosting has become hardened on all the cakes the entire supply can be removed at a single operation and without any great amount of labor or waste of time; and the invention consists in the construction and combination of parts hereinafter described, and pointed out in the claims.

In the drawings illustrating the invention, Figure 1 is a sectional elevation showing the rack-frame raised and in position to receive the supply of cakes on the rack-bars, a portion of the bars showing the cakes thereon; Fig. 2, a sectional elevation showing the rack frame and bars lowered and in position for simultaneously discharging the supply of cakes from the several bars; Fig. 3, a detail in sectional elevation, showing the rack-frame lowered and the stripper-frame depressed for the stripper-bars to remove the cakes from the retaining-pins of the rack-bars; Fig. 4, a sectional top or plan view showing the parts in the position of Fig. 2 with one corner of the rack-frame and rack-bars broken away to show the connection of the receiving-tray at its rear end with the rack-frame; Fig. 5, a sectional end elevation of the parts shown in Fig. 2; and Fig. 6, a detail in perspective of one rear corner of the receiving-tray, showing the recess for connecting the tray with the rear end of the rack-frame.

In constructing the rack a main frame is provided, having on each side a front and rear piece A, both pieces upwardly extended and diagonal to each other, with the side pieces connected by a cross-piece $a$ on each side, a front piece $a'$ at the bottom, and a rear piece $a^2$ at the top, forming an open frame front and rear, in which is located and supported the rack-frame proper, with its rack-bars, and also a stripping-frame, with its strippers. The rack-frame is formed of two side pieces B, each pivoted at its rear end by a suitable pin or pivot $b$ to the rear side of the main frame, so that the rack-frame can be swung up and down within the main frame. The side pieces B are connected at the front by a cross-piece $b'$, and the rack-frame is held in its raised or receiving position by the engagement of a hook or catch $b^2$ over the cross-piece $b'$, as shown in Fig. 1, which hook or catch is pivotally mounted in ears $b^3$ on the upper cross-piece $a^2$ of the main frame. The rack-frame is provided with a series of fixed rack-bars C, each rack-bar being secured to the side bars of the rack-frame by any suitable means. Each rack-bar is provided with a series of retaining-pins $c$, on which to stick the frosted cakes, each pin receiving a cake. As shown, each cake-bar, adjacent to the side piece B, is cut away, so as to leave a recess $c'$ for the admission of the side pieces of the stripper-frame. The stripper-frame is mounted above the rack-bars and within the space of the side bars B of the rack-frame and is formed of side bars D and a cross-bar E at the front and rear, each cross-bar in the construction shown having a projected end E'. The stripper-bars $d$, one for each rack-bar to coact with the retaining-pins of its rack-bar, are made, preferably, from a piece of wire bent to have a longitudinal body extending across the stripper-frame and turned at each end for attachment to the side pieces D of the stripper-frame, as shown in Figs. 4 and 5. The stripper-frame is to have an up-and-down movement in order to force the stripper-bars to act on the down movement and force the cakes from the retaining-pins of the rack-bars, and for this purpose the stripper-frame is supported on springs at the four corners in the construction shown, each spring $e$ encircling a bolt or guide rod $e'$ between the face of the rack-frame and the projected end $E'$ of the stripper-frame, as shown in Fig. 5, by which arrangement the stripper-frame is free to move down on the guide-rods, the springs $e$ yielding for this purpose, and with the release of the down pressure the springs act to return the stripper-frame to its normal position. The downward movement of the stripper-frame carries with it the stripper-bars $d$ for each bar to act on the series of pins adjacent to which the bar moves and force all the cakes carried by the series of pins from the pins simultaneously throughout the whole extent of the rack-frame. The cakes are all simultaneously discharged from the entire number of rack-bars and their series of pins by the downward movement of the stripper-bars, and the discharged cakes are deposited in a tray F, which tray extends beneath the rack when down, and, as shown, is formed of a body or plate having at the front and rear edge a guard-strip $f$, which strip may also be continued around the sides, if desired. The rear guide-strip is provided with a recess $f'$ at each corner. Each side piece B has at its front and rear end a leg or support $f^2$, the front legs resting when the tray is down, as shown in Fig. 2, on the body or plate of the tray, and the rear legs having a turned portion $f^3$, which supports the tray at the rear corner. The foot or turned end of each rear support enters the corner-recess $f'$ of the tray as the rack-frame is raised and holds the tray firmly in place, and with the ascent of the rack-frame the foot or turned ends are in position to receive the rear end of the tray for its forward end to project beyond the main frame and in easy position to be grasped and removed by the operator.

The rack as a whole is supported above the vessel G, containing the frosting, so that the cakes $g$ can be dipped in the frosting and then stuck successively onto the retaining-pins of the rack-bars until all of the pins have a cake thereon. The frosting vessel is supported in a suitable frame H, mounted on legs or standards H', and, as shown, the side pieces A of the main rack-frame have feet to rest on the top of the supporting-frame, as shown in Figs. 1 and 2. The cakes after being dipped in the frosting are placed one by one on the retaining-pins of the rack-bars, with the rack-frame resting in the position shown in Fig. 1, and when the rack is completely filled and the frosting properly hardened the tray F is slipped into place, as shown by dotted lines in Fig. 1, for its rear end to be supported on the legs or supports $f^2$ and its body to rest on the cross-piece $a'$. The rack-frame is then lowered into the position shown in Fig. 2, carrying the tray its full limit rearwardly and in position for its body or plate to lie underneath the entire rack to receive the cake. The stripper-frame is then forced downward by pressing on the front and rear pieces E or otherwise, carrying down the stripper-rods $d$ and simultaneously forcing the entire supply of cakes from the retaining-pins and depositing them on the tray. The rack-frame is then raised into the position shown in Fig. 1, advancing the tray, as shown by dotted lines in Fig. 1, so that it can be readily removed, and when raised the rack-frame is locked in its raised position by the latch or catch $b^2$ ready for the reception of the next batch of frosted cakes. These operations of dipping, sticking, and stripping the cakes can be continued until the required number of cakes has been frosted.

The rack is of simple construction and can be placed over a frosting vessel G, and when in position, with the tray removed, the cakes $g$ can be rapidly dipped and fixed to the retaining-pins, and when the rack is full the entire supply of cakes can be simultaneously deposited in the tray, thus making a great saving both in labor and time in the frosting and taking care of the cakes, as instead of requiring a separate operation for the removal of each cake the entire number on the rack can be simultaneously deposited on the tray with but a single movement of the stripper-frame and its rods.

I claim—

1. The combination, in a cake-rack, of a main frame, a rack-frame pivotally mounted on the main frame at one side to be raised into position for receiving cakes and lowered into position for discharging cakes, rack-bars fixed to the rack-frame each provided with cake-retainers, each retainer adapted to receive a cake, and a depressible stripper-frame mounted on the rack-frame and provided with strippers held retracted in affixing the cakes on the retainers and operable for the downward movement of the stripper-frame, when the rack-frame is lowered, to depress all the strippers at the same time and simultaneously remove the entire supply of cakes from the retainers, substantially as described.

2. The combination, in a cake-rack, of a main frame, a rack-frame pivotally mounted on the main frame at one side to be raised into position for receiving cakes and to be lowered into position for discharging cakes, rack-bars fixed to the rack-frame and each provided with a series of cake-retaining pins, each pin adapted to receive a cake on its point and a depressible stripper-frame mounted on the rack-frame and provided with a series of stripping-rods, one rod for each series of cake-retaining pins, held retracted or away from the points of the pins in affixing the cakes and operating to have the downward movement of the stripper-frame, when the rack-bar is lowered, to depress all the stripper-rods at the same time and simultaneously remove the entire supply of cakes from all the retaining-pins, substantially as described.

3. The combination, in a cake-rack, of a main frame, a rack-frame pivotally mounted on the main frame at one side to be raised into position for receiving cakes and lowered into position for discharging cakes, rack-bars fixed to the rack-frame and each provided with a series of cake-retaining pins each pin adapted to receive a cake on its point, and a depressible stripper-frame mounted on the rack-frame and provided with a series of stripping-rods, one rod for each series of cake-retaining pins, held retracted or away from the points of the pins in affixing the cakes, and a yielding support between the stripper-frame and the rack-frame for holding the stripper-frame in its retracted position and permitting a downward movement thereof, when the rack-frame is lowered, to depress all the stripper-rods at the same time and simultaneously remove the entire supply of cakes from all of the retaining-pins, substantially as described.

4. The combination in a cake-rack, of a main frame a rack-frame pivotally mounted on the main frame to swing up and down, rack-bars carried by the rack-frame and each provided with a series of cake-retaining pins, a movable stripper-frame provided with a series of stripping-rods, one rod for each series of cake-retaining pins, a spring-support between the stripper-frame and the rack-frame, and a tray for receiving the cakes from the retaining-pins when removed by the downward thrust of the stripping-frame and its rods, substantially as described.

ADOLPH MUEHLBEIN.

Witnesses:
THOMAS B. MCGREGOR,
ANNIE C. COURTENAY.